(12) United States Patent
Kim et al.

(10) Patent No.: US 7,486,509 B2
(45) Date of Patent: Feb. 3, 2009

(54) BRACKET FOR DISK DRIVE

(75) Inventors: Ki-Bum Kim, Gumi-si (KR); Eun Deok Bae, Suwon-si (KR); Dong Ok Kwak, Suwon-si (KR); Ki Taek Kim, Yongin-si (KR); Seong Woon Booh, Yongin-si (KR); Jin Woo Cho, Seongnam-si (KR); Kwang Jin Bae, Gumsi-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 390 days.

(21) Appl. No.: 11/320,971

(22) Filed: Dec. 30, 2005

(65) Prior Publication Data

US 2007/0014086 A1    Jan. 18, 2007

(30) Foreign Application Priority Data

Jul. 18, 2005   (KR) ............... 10-2005-0064726
Sep. 8, 2005   (KR) ............... 10-2005-0083696

(51) Int. Cl.
   *G06F 1/16* (2006.01)
(52) U.S. Cl. ............... 361/685; 248/300; 312/223.3
(58) Field of Classification Search ........... 248/248, 248/300; 312/223.1–223.6; 211/216; 361/679–687, 361/724–727
   See application file for complete search history.

(56) References Cited

U.S. PATENT DOCUMENTS 4,937,806 A    6/1990   Babson et al.
5,400,196 A    3/1995   Moser et al.
5,564,804 A *  10/1996  Gonzalez et al. .......... 312/223.2
5,768,009 A *  6/1998   Little ....................... 361/685
6,418,012 B1 * 7/2002   Dials et al. ................ 361/685
2003/0035281 A1 2/2003 Huang et al.
2007/0014087 A1 * 1/2007 Kwak et al. ................ 361/685

FOREIGN PATENT DOCUMENTS

| JP | 01-205784   | 8/1989  |
| JP | 10-222972   | 8/1998  |
| JP | 2000-349453 | 12/2000 |
| JP | 2001-126462 | 5/2001  |
| JP | 2002-358140 | 12/2002 |

(Continued)

OTHER PUBLICATIONS

International Search Report for International Application No. PCT/IT 02/00410 dated Oct. 25, 2002.

*Primary Examiner*—Hung V Duong
(74) *Attorney, Agent, or Firm*—Staas & Halsey LLP

(57) ABSTRACT

A bracket for a disk drive, including: a base plate containing the disk drive; a side wall portion vertically protruded from an end portion of the base plate; and a displacement portion extended from the side wall portion and bending due to a vibration transmitted by making contact with the disk drive. Accordingly, a bracket according to the present invention has an improved buffering ability without installing a buffer. Also, the bracket can not only effectively protect a disk drive from an external impact but also be applied to an electric device such as a portable device. Also, a bracket according to another embodiment can prevent mutual interference between circuits provided on the bracket.

30 Claims, 9 Drawing Sheets

FOREIGN PATENT DOCUMENTS

| | | |
|---|---|---|
| JP | 12003-242764 | 8/2003 |
| JP | 2003-272371 | 9/2003 |
| JP | 2004-139670 | 5/2004 |
| KR | 1996-24957 | 7/1996 |
| KR | 20-124407 | 6/1998 |
| KR | 2000-21053 | 12/2000 |
| KR | 20-360854 | 8/2004 |
| WO | WO 03/001774 | 1/2003 |

* cited by examiner

BRACKET FOR DISK DRIVE

CROSS-REFERENCE TO RELATED APPLICATIONS

This application claims the benefit of Korean Application Nos. 10-2005-0064726, filed Jul. 18, 2005, and 10-2005-0083696, filed Sep. 8, 2005, in the Korean Intellectual Property Office, the disclosure of which is incorporated herein by reference.

BACKGROUND OF THE INVENTION

1. Field of the Invention

The present invention relates to a disk drive, and more particularly, to a bracket for a disk drive which can protect a disk drive from impact by its buffering ability and prevent mutual interference between circuits positioned below the bracket.

2. Description of the Related Art

A Hard Disk Drive (hereinafter, HDD) mounted on a bracket generally includes a spindle motor to rotate a disk and an actuator having a head for recording data to the disk and reading the data recorded on the disk. An internal vibration occurs due to the spindle motor or the actuator embedded in the HDD. A vibration blocking mount is used for solving this problem, thereby minimizing the rotation vibration factor caused by inner spindle force, as disclosed in U.S. Pat. No. 5,400,196. However, vibration introduced from an external source may be not prevented. A matter of greater concern than internal vibration is a vibration caused by an external impact. As HDDs become miniaturized and lightened and attached to a portable device, vibration caused by an external impact becomes a more serious matter.

An external impact causes damage to a HDD, such as the dislocation of the rotation center of a disk, damage to a magnetic disk, interference to the normal operation of a spindle motor, interference in reading recorded information and magnetic or physical destruction of the recorded information. Currently, an ultra slim HDD is determined to be the optimal storage medium since it is cheaper than a general flash memory device with comparable capacity and the power consumption is less than 1 W which makes it possible to be installed in a portable device. Accordingly, an ultra slim HDD was developed where the thickness was reduced to less than 1 inch, such that the ultra slim HDD was installed in a portable device. A product whose thickness is 1 inch is being used in an MP3 (MPEG Audio Layer-3) player or PMP (Portable Multimedia Player), and a product whose thickness is less than 1 inch may be applicable to not only a cellular phone, but also a wireless AP (Access Point), a PDA (Personal Digital Assistant), or a navigational system. Thus, the ultra slim HDD is expected to extend its share of the market.

As described above, the application range of an ultra slim HDD is becoming extensive, but research on a method of protecting the HDD from vibration occurring due to an external impact is unsatisfactory.

FIG. 1 is an exploded perspective view illustrating a buffer member attached on a conventional HDD. This invention is disclosed in U.S. Patent Appl. Pub. No. 2003/35281A1. As illustrated in the figure, the invention discloses that an HDD 2 is mounted on a bracket 12 and a plurality of buffer members 131, 132, 133, and 134 are provided below the bracket 12, which makes it possible to absorb impact. In FIG. 1, drawing symbol 3 is a buffer module, 311 is an upper case, and 312 is a lower case, which are not described herein.

However, in the case of separately providing buffer members, the installation space of an ultra slim HDD installed in a portable device is insufficient. Also, the entire size of a module becomes larger due to the size of the buffer members. Also, in the case of using a member whose maximum compressed ratio is about 30%, such as rubber, as a buffer member, its buffering ability may be less than 50%. Also, in the case the displacement of an HDD caused by an external impact is large, a second impact may occur.

Also, in the case of an HDD installed in a portable device, an external impact acceleration is generally more than 5000G. In the case of an HDD installed in a portable device, vibration and impacts occur more frequently and with greater intensity than when installed in a personal computer. With a portable device, there is the problem of not installing an effective amount of buffer members or the vibration blocking mount can not be properly installed due to the limitation for the size and weight of the HDD.

Also, there is needed a buffer which is applicable to not only the HDD but also a disk drive including a motor such as an optical disk drive, and capable of effectively buffering an external impact and an internal vibration.

SUMMARY OF THE INVENTION

Additional aspects and/or advantages of the invention will be set forth in part in the description which follows and, in part, will be apparent from the description, or may be learned by practice of the invention.

To solve the problems described above, the present invention provides a bracket that can effectively protect a disk drive such as an HDD from an external impact, without installing a buffer member or vibration blocking mount.

The present invention also provides a bracket which has a buffering ability and whose size and weight are small enough to be installed in a disk drive without increasing the size and the weight since no additional buffering device is installed.

The present invention also provides a bracket that embodies low rigidity and has an improved buffering function by reducing the natural frequency of the bracket.

The present invention also provides a bracket that has an excellent buffering ability and can prevent the interference between circuits positioned on the bracket.

The present invention also provides a bracket that can effectively protect a disk drive from a second impact and the second impact occurs when the displacement of the disk drive is large due to a huge external impact.

To achieve the objectives as described above, according to an aspect of the present invention, there is provided a bracket for a disk drive, including: a base plate containing the disk drive; a side wall portion vertically protruded from an end portion of the base plate; and a displacement portion extended from the side wall portion and bending due to a vibration transmitted by making contact with the disk drive.

The side wall portion may be protruded from a corner of the base plate in the shape of an "L" or may be protruded from an end portion of the sideface of the base plate to be parallel therewith in the shape of an "I".

The displacement portion may be inwardly bent to be in contact with the disk drive in the shape of an "S" or may be spaced apart at a certain interval from the base plate, extended from both ends of the side of the side wall portion and in contact with the sideface of the disk drive. Also, the displacement portion includes: an extension portion extended from the side wall portion in the direction of the side surface of the hard disk; a bent portion inwardly bent from the extension portion; and a contact portion extended from the bent portion to be in surface contact with the sideface of the disk drive.

The bracket may be formed of plastic resin and manufactured by injection molding.

According to another aspect of the present invention, there is provided a bracket for a disk drive, where the bracket contains the disk drive on its one surface, and includes: side wall portions vertically protruded from the one surface; a displacement portion extended from the side wall portion in the direction of the one surface, spaced apart from the one surface and bending due to a vibration transmitted by making contact with the disk drive; and a partition wall protruded from the surface opposite to the one surface, isolating circuits provided below the opposite surface and preventing mutual interference caused by electromagnetic waves.

The side wall portion may be protruded from the sideface of the bracket in the vertical direction of the one surface and in the shape of an "I", and the displacement portions may be extended from both sides of the side wall portion and inwardly bent to be in surface contact with the sideface of the disk drive. Or, the side wall portion may be protruded from the corner of the one surface and in the shape of an "L", and the displacement portions may be extended from both sides of the side wall portion and inwardly bent to be in contact with the sideface of the disk drive.

According to yet another aspect of the present invention, there is provided a bracket for a disk drive, where the bracket contains the disk drive and includes partition walls protruded from the surface opposite to the surface where the disk drive is mounted, and the partition walls isolate circuits provided below the bracket and prevent the mutual interference caused by electromagnetic waves.

A metal coating is formed on the surface of the bracket where the partition walls are formed.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
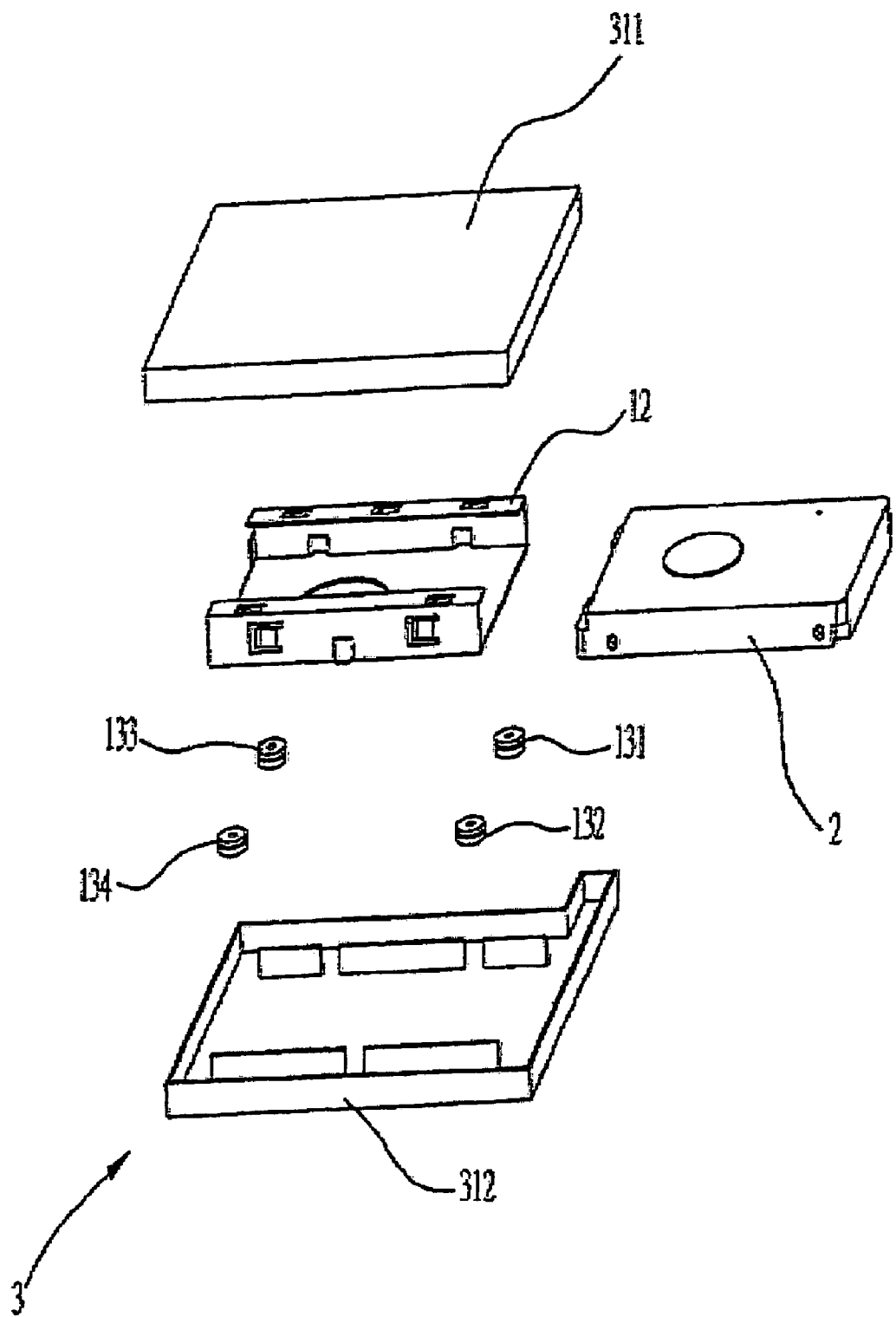
FIG. 1 is an exploded perspective view illustrating a buffer member attached on a conventional HDD.

Reference will now be made in detail to the embodiments of the present invention, examples of which are illustrated in the accompanying drawings, wherein like reference numerals refer to the like elements throughout. The embodiments are described below to explain the present invention by referring to the figures.

Embodiment 1

Figure 2:
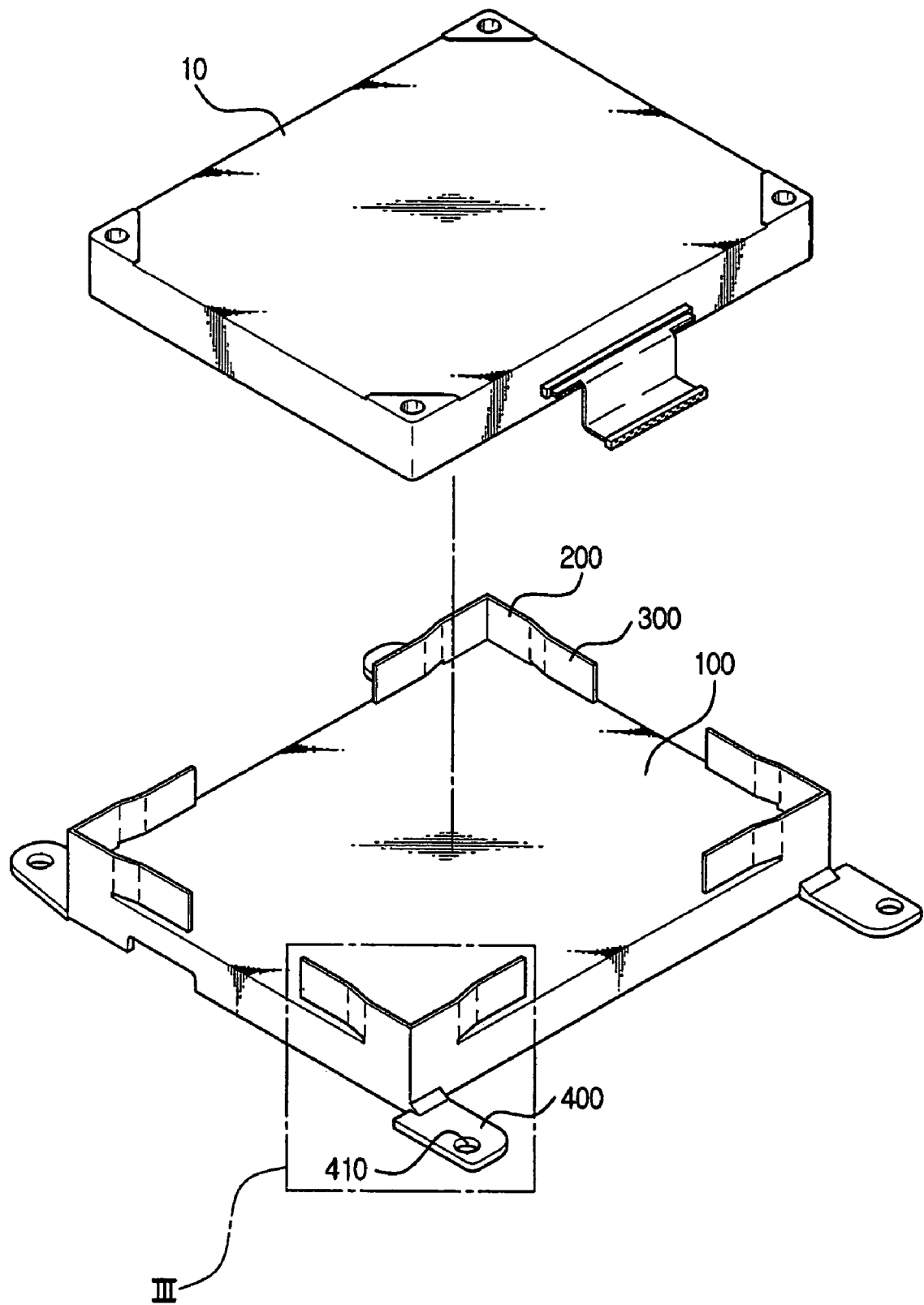
FIG. 2 is a perspective view illustrating a bracket for a disk drive according to a first embodiment of the present invention.
Figure 3:
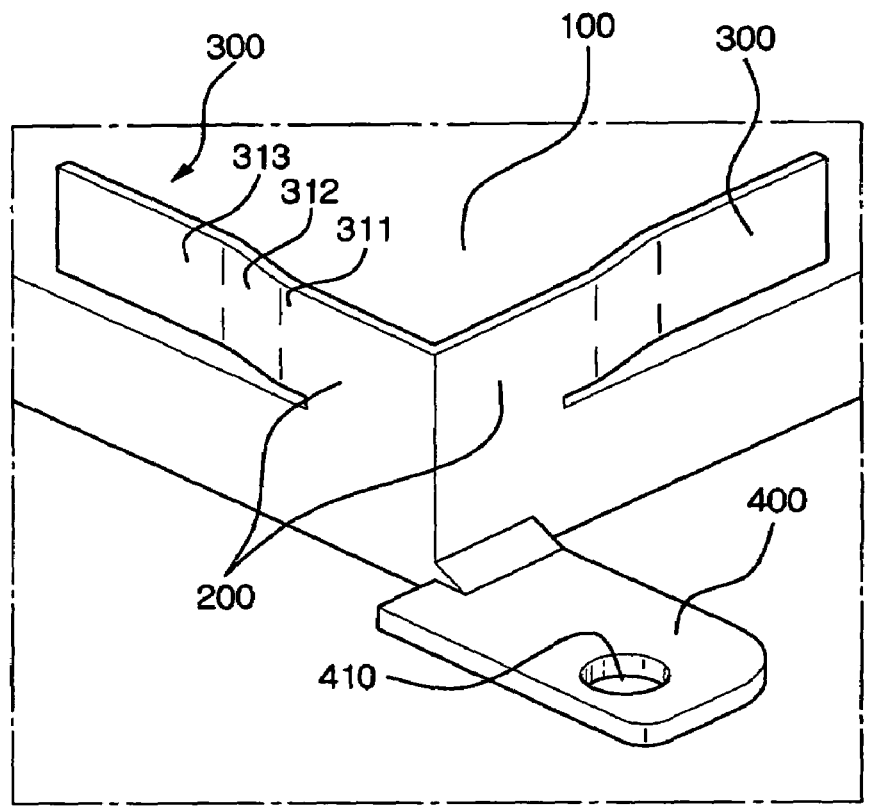
FIG. 3 is an enlarged perspective view illustrating part "III" in FIG. 2.

FIG. 2 is a perspective view illustrating a bracket for a disk drive according to a first embodiment of the present invention, and FIG. 3 is an enlarged perspective view illustrating part "III" in FIG. 2.

As illustrated in the figures, a disk drive 10 of the present invention includes a base plate 100, side wall portions 200, and displacement portions 300.

The base plate 100 is formed in the identical shape to the disk drive 10 and the size of the base plate 100 is formed to be slightly larger than the disk drive 10. For example, if the disk drive 10 is a right hexahedron, the base plate 100 has an installation space whose section is a square in order to match with the square corner of the disk drive 10, and the size of the base plate 100 is formed to be a little larger to contain the displacement due to vibration with the displacement portions 300. The displacement portion 300 will be described later. In the case of the shape of the disk drive 10 being different, the base plate 100 may be different in correspondence thereto.

A combining portion 400 is extended from each corner of the base plate 100 and connected to a portable device. The combining portion 400 includes a hole 410, according to the present invention, so that the combining portion 400 may be forcibly attached to each corner by using a bolt 420, but is not limited to the bolt 420. The combining portion 400 may be forcibly attached to each corner by various methods, such as welding, a rivet, tape or adhesives.

The base plate 100 may be manufactured by using a plastic resin. Also, The base plate 100 may be manufactured via injection molding using a plastic resin. Namely, since the base plate 100 including the side wall portions 200 and the displacement portions 300 may be molded at the same time by injection, the productivity may be improved.

The side wall portions 200 are vertically extended from four corners of the base plate 100 and the width and height of each side wall portion 200 is uniform. Namely, the side wall portion 200 is protruded from each corner of the base plate 100, in the shape of an "L". The base plate 100 is formed larger than the disk drive 10. Thus, when the disk drive 10 is contained in the base plate 100, the side wall portions 200 vertically extended from the corners of the base plate 100 do not make contact with the disk drive 10.

A position of the side wall portion 200 is not limited to the corner of the base plate 100. The side wall portion 200 may be formed on any position of an end portion of the base plate 100, if said any position is not in contact with a disk drive and is not interfering with the mounting of the disk drive. Detailed description related thereto will be described in embodiment 2.

Only one side of the displacement portion 300 is connected to the side wall portion 200, and constructed to be capable of bending or rotating to a certain extent. Also, the displacement portion 300 is inwardly bent in the shape of an "S".

Figure 4:
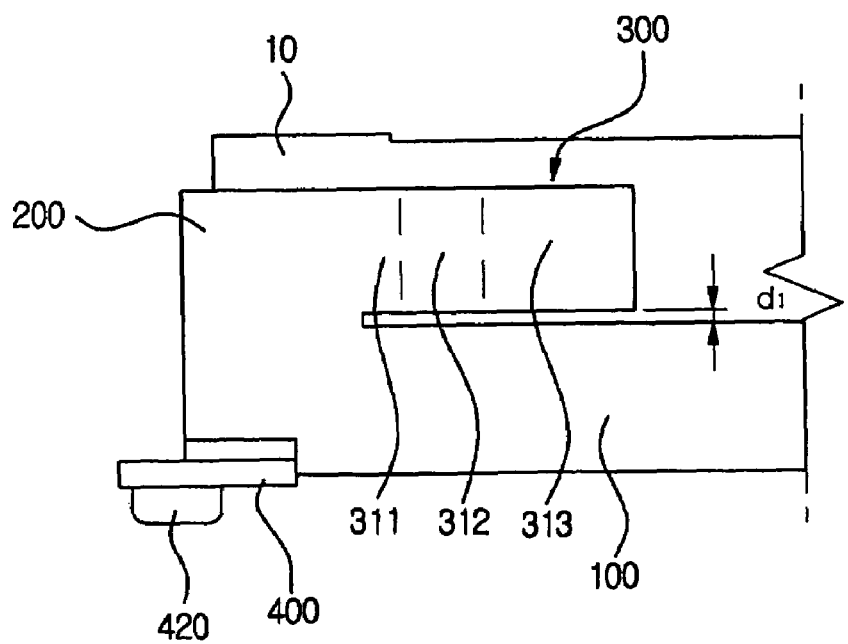
FIG. 4 is a side view illustrating the bracket for the disk drive according to the first embodiment of the present invention.
Figure 5:
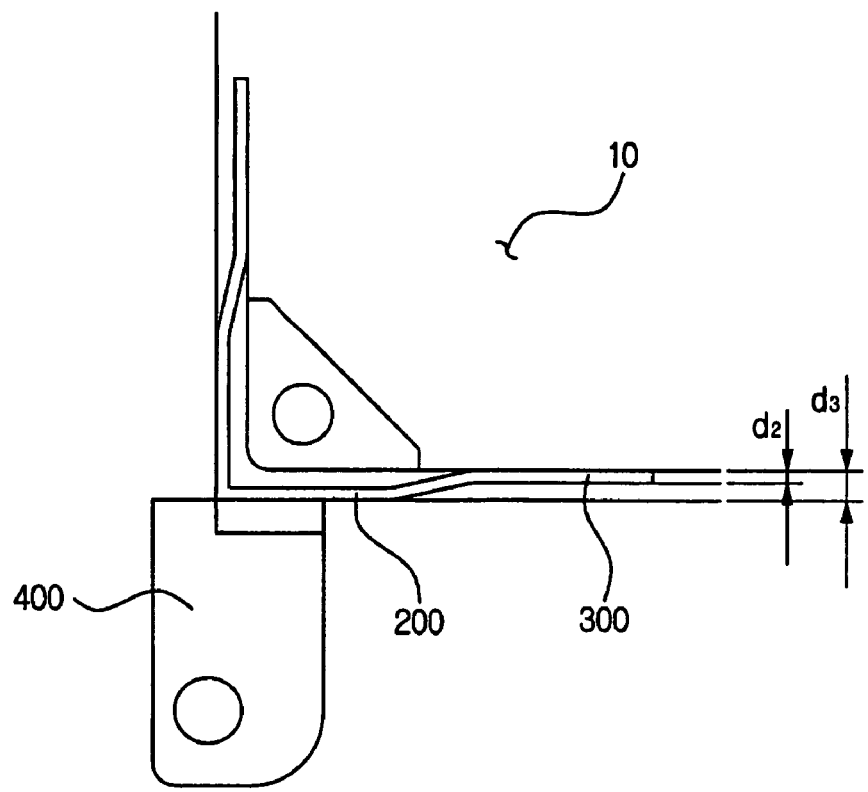
FIG. 5 is a top view illustrating the bracket for the disk drive according to the first embodiment of the present invention.

The above will be further described in detail with reference to FIGS. 4 and 5. FIG. 4 is a side view illustrating the bracket for the disk drive according to the first embodiment of the present invention, and FIG. 5 is a top view illustrating the bracket for the disk drive according to the first embodiment of the present invention.

As illustrated in the figures, the displacement portion 300 includes an extension portion 311, a bent portion 312 and a contact portion 313. The extension portion 311 is extended from the side wall 200 to be in parallel therewith. The bent portion 312 is inwardly bent from the extension portion 311. The contact portion 313 is extended from the bent portion 312 to be in contact with the sideface of a disk drive.

The displacement portion 300 is horizontally extended from the base plate 100 to be in contact with a side wall of the disk drive 10. Also, the displacement portion 300 is spaced apart from the base plate 100 at a predetermined interval d1. The interval d1 serves to allow freedom so that the displacement portion 300 can bend according to a vibration of the disk drive 10. The smaller the size of the interval d1, the better, but should be within a range which does not interfere with the displacement of the displacement portion 300.

The thickness d2 of the displacement portion 300 may be less than 0.4 mm. The interval d3 between the disk drive 10 and the side wall portion 200 is a space where the displacement portion 300 can bend to the maximum, which is less than 1 mm. If the displacement portion 300 bends beyond the range of d3, the displacement portion 300 may have an impact with an external device. However, if designed as described above, a disk drive can be protected from an external impact, which occurs when the displacement is beyond the range of about 0.6 mm.

Hereinafter, the effects of the present invention will be described as follows.

The displacement portion acts as a plate spring and helps a bracket to embody a low rigidity. Also, a low rigidity functions to reduce the natural frequency and improve a vibration characteristic.

Figure 6:
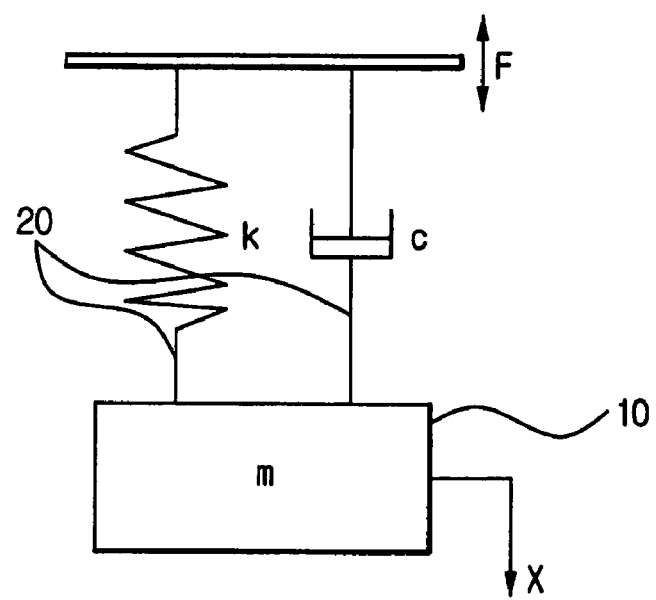
FIG. 6 is a view modeling a disk and a bracket.

To describe in detail by referring to FIG. 6, it may be modeled that the disk drive 10 is a mass having the mass m and the bracket 20 is a spring having a rigidity coefficient k and damping coefficient c. In the case the bracket 20 and the disk drive 10 are modeled as a second system, the equation of motion of the system with respect to an external input F is as $m \cdot d^2(x)/dt^2 + c \cdot d(x)/dt + k \cdot x = F$ [Equation 1]

In this case, $W_n$ is the natural frequency of the system as $Wn = \sqrt{k/m}$ [Equation 2]

As shown in Equation 2, the rigidity is in proportion to the natural frequency. Namely, in the case where the rigidity is reduced, the natural frequency is reduced, thereby improving the vibration characteristic.

In the system, in the case where an external input whose size is $A_{in}$ and frequency $w_d$ is inputted, the external input F is shown in Equation 3 and frequency ratio and transmittance are as Equations 4 and 5, respectively, $F = A_{in} \sin w_d t$ [Equation 3]

frequency ratio $= wd/wn$ [Equation 4]

transmittance $= A_{out}/A_{in}$ [Equation 5]

Figure 7:
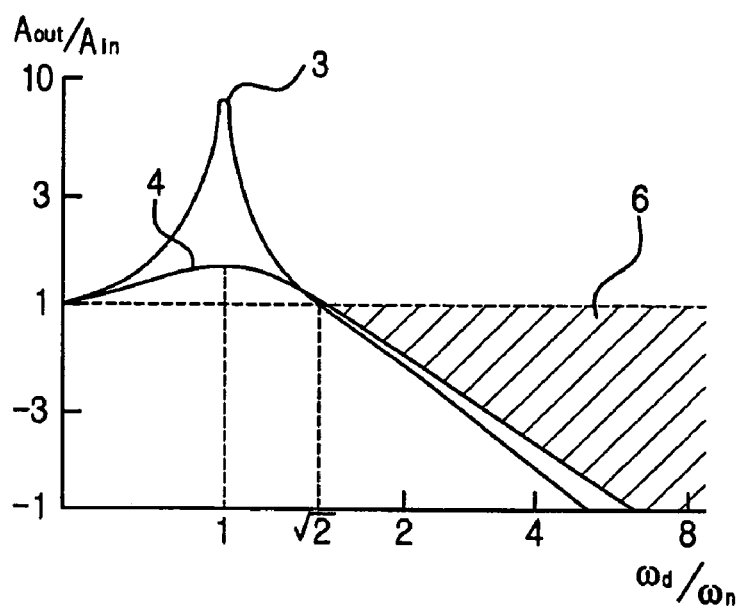
FIG. 7 is a graph illustrating the transmissibility according to a change in frequency.

In this case, $A_{out}$ is the maximum amplitude of movement of the disk drive 2. The relation between the rigidity, or the natural frequency, and vibration characteristic is illustrated in detail in FIG. 7. In FIG. 7, the x axis indicates the frequency ratio and the y axis indicates the transmittance in a log scale. As illustrated, in the case of Equation 3 where a damping coefficient is low, transmittance most severely spikes in the case of an external input identical with the natural frequency, namely, where the x axis is 1, and enters a buffer zone 6 where the frequency ratio is $\sqrt{2}$. In the case of 4 where a damping coefficient is high, transmittance shows a similar shape. In this case, the buffer area 6 indicates an area where the transmittance is less than 1, in which the amount of the external impact $A_{in}$ becomes less than the transmitted amount $A_{out}$.

Namely, in the case where the frequency ratio is more than $\sqrt{2}$ regardless of the decrement value, it enters the buffer area 6 and greater buffer effect may be expected because the frequency ratio is in inverse proportion to the natural frequency. Also, since the natural frequency is in proportion to the rigidity, it is previously considered to lower the rigidity in designing a bracket.

Figure 8:
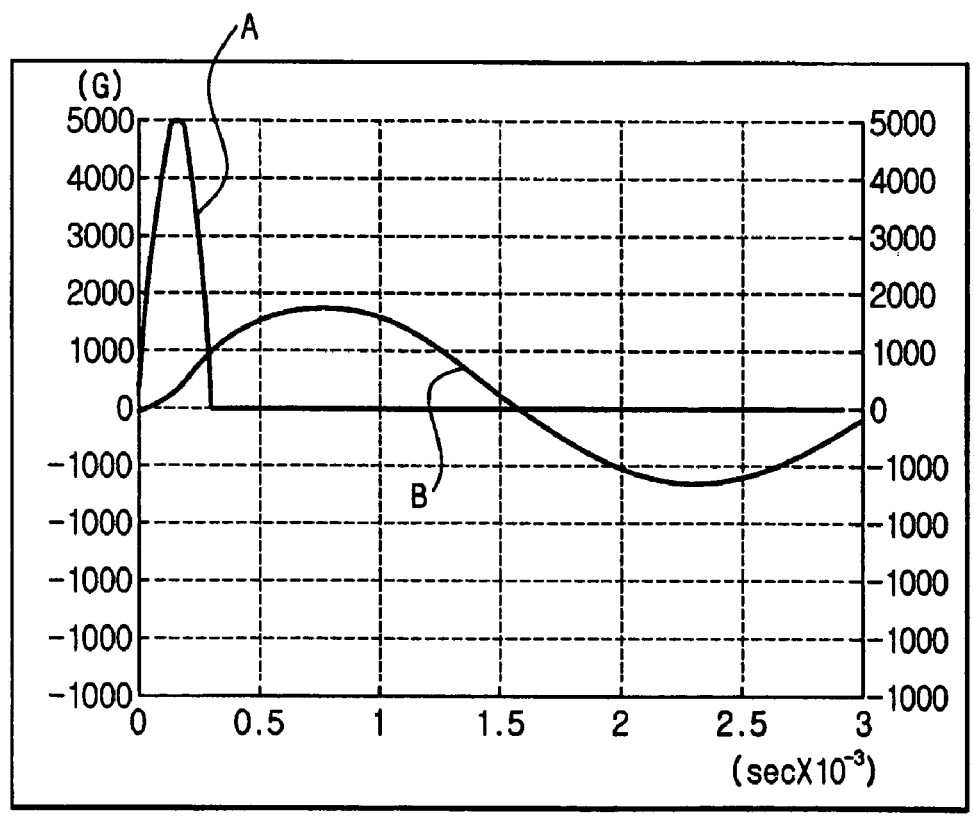
FIG. 8 is a graph illustrating the size of impact acceleration with respect to time.

To prove the effects of the present invention, simulation results are shown in FIG. 8. FIG. 8 is a graph illustrating the size of impact acceleration with respect to time.

As illustrated in the figure, in the case an external input A in the shape of half sine is inputted to about 5000G, which is 5000 times of the acceleration of gravity, for about 0.3 msec, the maximum size of acceleration B transmitted to a disk drive is 1744 G and transmission is 34.8%. Thus, there is more or less 65% buffering effect. In this case, the mass m of the disk drive is 12.5 g, the rigidity coefficient k is 54.8 kN/m, the damping coefficient is 0.1, and the natural frequency $W_n$ of the system is 333.3 Hz.

Accordingly, since a bracket has an improved buffering function by embodying a low rigidity and reducing the natural frequency of the bracket, the bracket can effectively protect a disk drive from an external impact, without installing a buffer member or vibration blocking mount. Also, since an additional device is not needed, the bracket has a small installation space and is lightweight. If a buffer member and a bracket according to the present invention are used together because there is sufficient installation space, buffering effects may be greater and more effective.

Figure 9:
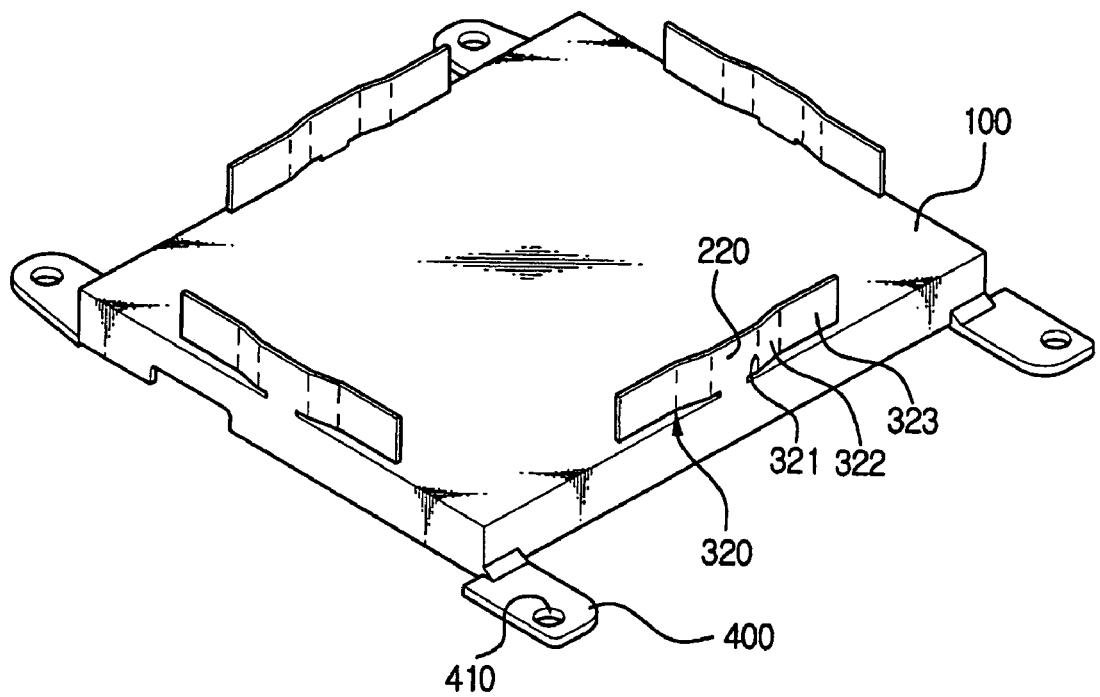
FIG. 9 is a perspective view illustrating a bracket for a disk drive according to a modified example of the first embodiment of the present invention.

FIG. 9 is a perspective view illustrating a bracket for a disk drive according to a modified example of the first embodiment of the present invention.

As illustrated, a side wall portion 220 is protruded from the side face of the bracket in the vertical direction of the one surface and in the shape of an "I". Displacement portions 320 are extended from both sides of the side wall portion 220 and inwardly bent to be in contact with the side surface of the disk drive.

The displacement portion 320 includes an extension portion 321, a bent portion 322 and a contact portion 323. The extension portion 321 is extended from the side wall portion 220 to be in parallel therewith. The bent portion 322 is inwardly bent from the extension portion 321. The contact portion 323 is extended from the bent portion 322 to be in contact with the side of the disk drive.

Embodiment 2

Figure 10:
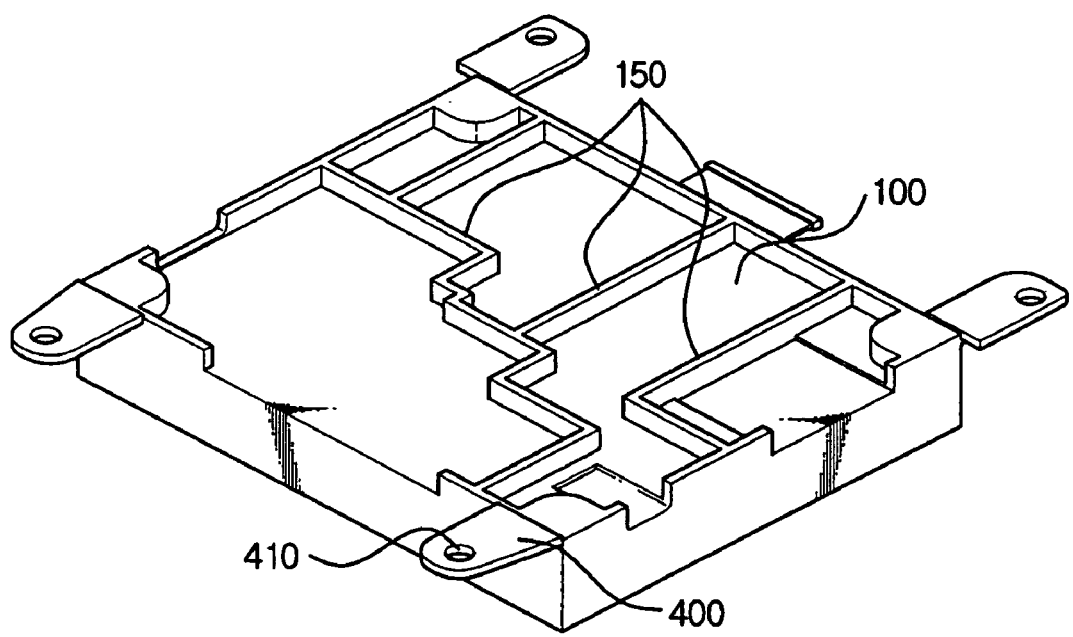
FIG. 10 is a perspective view illustrating the rear of a bracket for a disk drive according to a second embodiment of the present invention.
Figure 11:
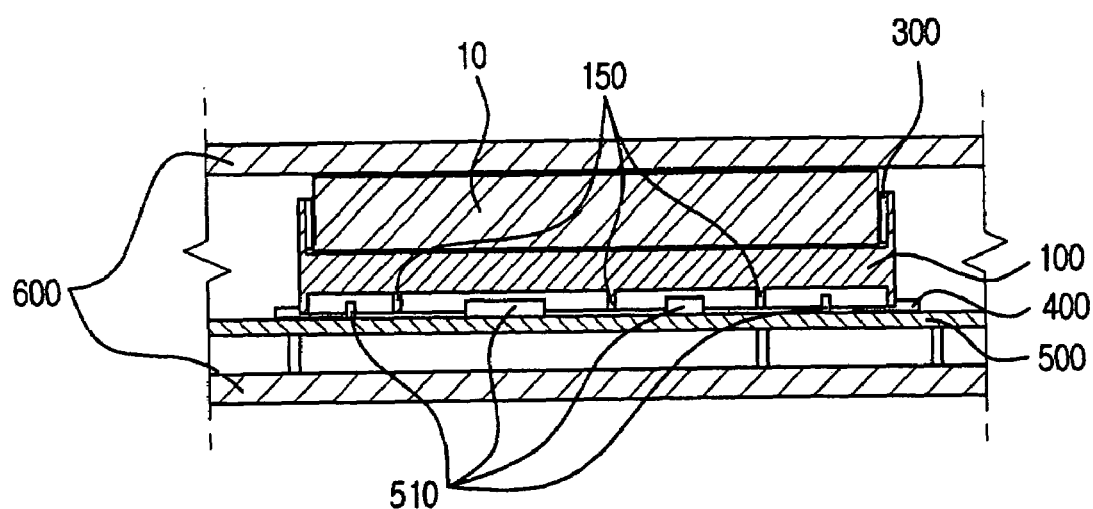
FIG. 11 is a sectional view illustrating how the bracket for the disk drive according to the second embodiment of the present invention is mounted in a portable device.

FIG. 10 is a perspective view illustrating the bottom of a bracket for a disk drive according to a second embodiment of the present invention, and FIG. 11 is a sectional view illustrating how the bracket for the disk drive according to the second embodiment of the present invention is mounted in a portable device.

As illustrated in the figures, a disk drive 10 is mounted in an electronic device such as a portable device. In the present embodiment, a portable device was used as an example of an electronic device, but the present invention is not limited thereto.

Also, a partition wall 150 is protruded from a position opposite to the base plate 100 containing the disk drive 10 and isolates circuits 510 and prevents interference between the circuits 510. The circuits 510 are provided on a printed circuit board 500 (hereinafter, PCB). The disk drive 10, bracket and PCB 500 are fixed in a housing 600 of a portable device.

When the circuits 510 are driven, electromagnetic waves generate around the circuits 510 and cause the malfunction of other circuit members. However, since the partition walls 150 isolate the circuits 510, the interference as above can be prevented. Also, in the case where a metal coating is formed on the opposite surface of the base plate 100, the interference between the circuits can be further prevented. It is more effective to form the partition walls 150 between circuits generating more electromagnetic waves and isolate the circuits. Circuits generating more electromagnetic waves generally function at a high-frequency.

Namely, the surface of the base plate 100 where the disk drive 10 is mounted is used to fix the disk drive 10 by using the displacement portions 300. Also, the partition walls 150 are formed on the surface of the base plate 100 where the disk drive 10 is not mounted, and prevent interference between the circuits 510 provided on the PCB 500. In other words, the present invention includes partition walls protruded from the surface opposite to the surface where the disk drive is mounted. The configuration as above can not only effectively protect a disk drive from an external impact but also prevent the interference between circuits positioned on a bracket.

Embodiment 3

Figure 12:
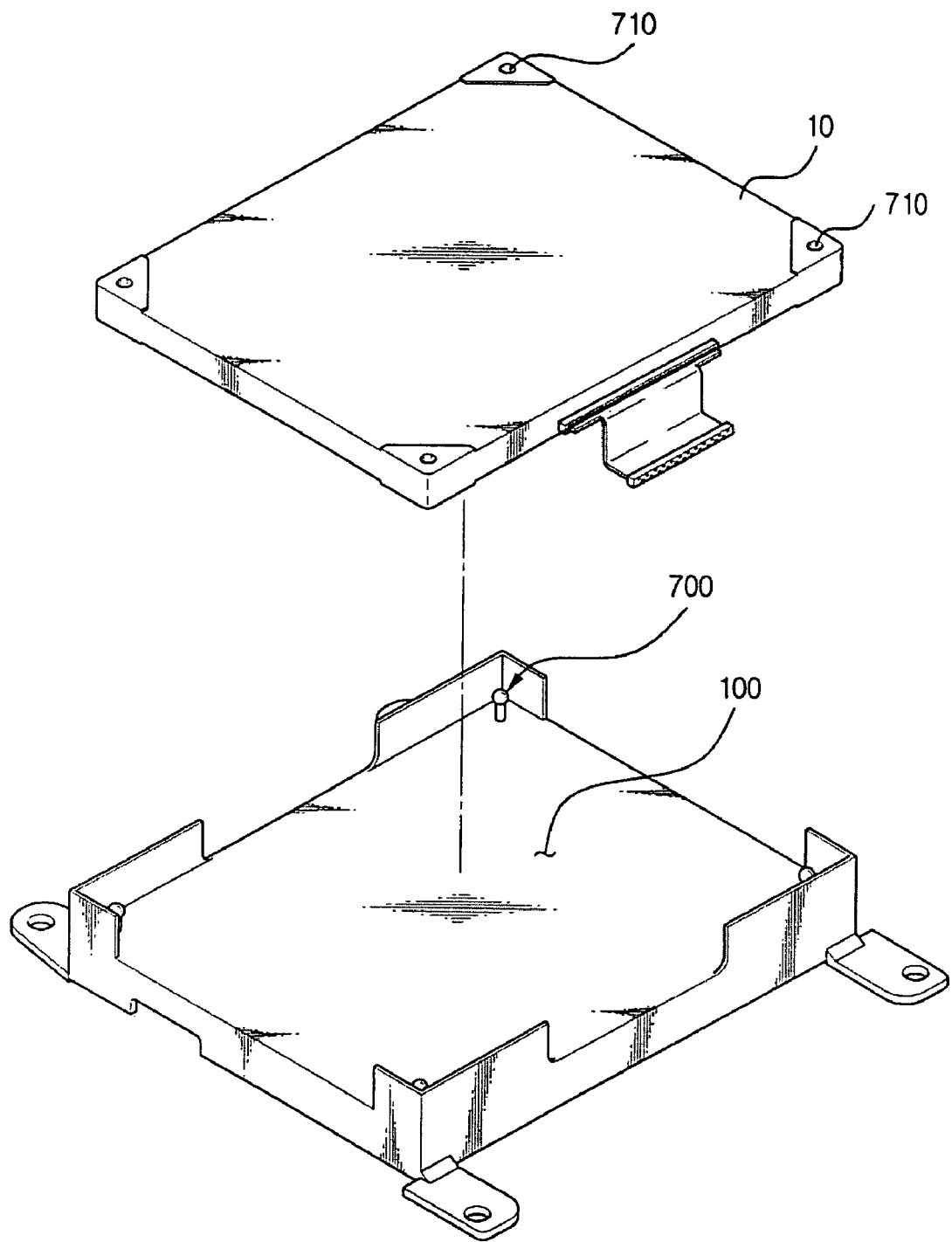
FIG. 12 is a perspective view illustrating a bracket for a disk drive according to a third embodiment of the present invention.
Figure 13:
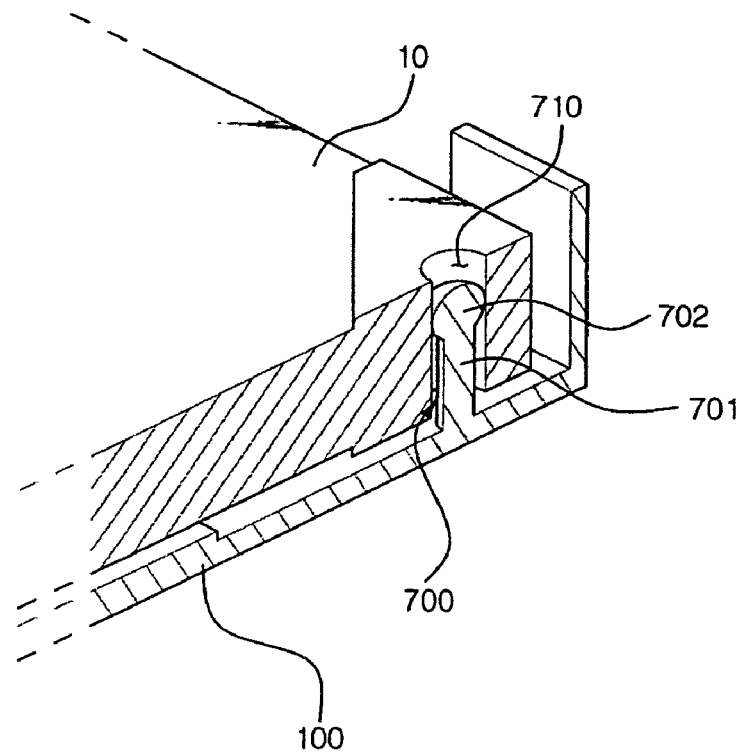
FIG. 13 is a partial sectional view illustrating the combined bracket and disk drive according to the third embodiment.

FIG. 12 is a perspective view illustrating a bracket for a disk drive according to a third embodiment of the present invention, and FIG. 13 is a partial sectional view illustrating the combined bracket and disk drive according to the third embodiment.

As illustrated in the figures, a combination protrusion 700 is vertically protruded from a base plate 100 of a bracket and inserted into a hole 710 of a disk drive 10. The holes 710 are formed on each corner of the disk drive 10. The inside of the hole 710 may be formed of a cylinder or a cone or a truncated cone whose diameter gets narrower as it goes up to be forcibly combined with the combination protrusion 700.

The combination protrusion 700 includes a projection portion 701 and a contact portion 702. The projection portion 701 is vertically protruded from a position corresponding to a position of the hole 710 and the contact portion 702 is formed at the end of the projection portion 701 and inserted into the hole 710. The contact portion 702 is in the shape of a sphere, but not limited thereto. The contact portion may have various shapes. The hole 710 may have a projection in its inside so that the contact portion 702 is forcibly inserted into the hole 710 at a certain position.

The combination protrusion 700 is combined with the disk drive 10. In this case, no side surface or bottom surface of the disk drive 10 may be in contact with a bracket. In this case, the combination protrusion 700 is in the form of a cantilever and the displacement of its end is analytically shown as $$displacement = PL^3/3EI$$ [Equation 6]

In this case, P is power per the unit area, L is the length of a combination protrusion, E is an elastic coefficient, and I is the moment of second inertia. Namely, in the case the displacement of the disk drive 10 occurs due to an external impact or internal vibration, the combination protrusion 700 in the shape of a cantilever also bends and vibrates itself to be capable of absorbing a part of a load.

Also, if not only the combination protrusion 700 but also side wall portions illustrated in the first embodiment are extended and in contact with the sideface of the disk drive 10, a buffering ability may be further improved. Namely, the vibration of the disk drive 10 is first buffered by the side wall portions making contact with the disk drive 10 and second, absorbed by means of self-vibration of the combination protrusions 700. Thus, a greater buffering ability may be expected.

Also, the combination protrusion 700 may be provided on the rear surface of a bracket having a partition wall capable of preventing mutual interference by electromagnetic waves as illustrated in the second embodiment.

Figure 14:
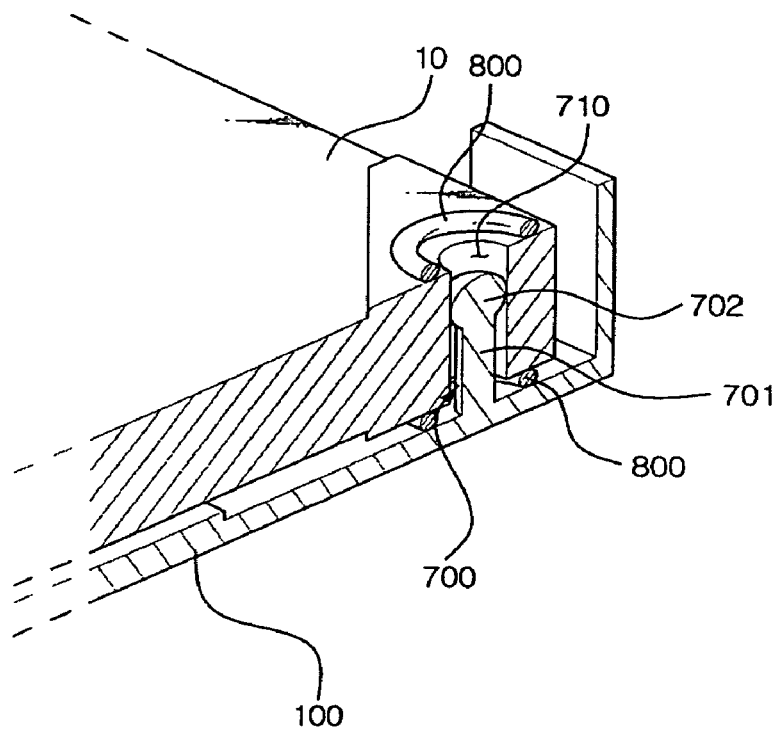
FIG. 14 is a partial sectional view illustrating a modified example of the third embodiment of the present invention.

FIG. 14 is a partial sectional view illustrating a modified example of the third embodiment of the present invention. As illustrated in the figure, the disk drive 10 may further have buffer members 800 disposed around the upper and lower portions of the hole 710. The buffer member 800 is capable of absorbing a vertical vibration. The buffer members 800 may have elasticity and be provided to the upper and lower portions of the disk drive 10. Also, the buffer member 800 may be provided between a bracket and the sideface of the disk drive. Namely, double buffering effects may be achieved by using the buffering members 800 and the combination protrusions 700 together.

A bracket according to the present invention can not only effectively protect a disk drive from an external impact, but also reduce cost since the bracket can be mass produced by injection molding.

Also, a bracket according to the present invention has a low rigidity and its buffering ability is improved by reducing the natural frequency.

Also, since a bracket according to the present invention has an improved buffering ability without installing a buffer member or vibration blocking mount, the size of the bracket can be manufactured small. Accordingly, the bracket is applicable to an electric device such as a portable device which is frequently exposed to an external impact and has a small installation space.

Also, a bracket according to the present invention can effectively protect a disk drive from a second impact occurring when the displacement of the disk drive is large due to a huge external impact.

Also, a bracket according to the present invention can buffer a vibration of a disk drive by using a combination protrusion in the shape of a cantilever.

Also, a bracket according to the present invention not only has an improved buffering ability but also prevents interference between circuits positioned on the bracket.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A bracket for a disk drive, comprising:
   a base plate containing the disk drive;
   a side wall portion vertically protruded from an end portion of the base plate; and displacement portions extended from the side wall portion and bending due to a vibration transmitted by making contact with the disk drive, wherein the displacement portions are spaced apart at a certain interval from the base plate, extended from both ends of the side of the side wall portion and in contact with the sideface of the disk drive.

2. The bracket of claim 1, wherein the side wall portion is protruded from a corner of the base plate and in the shape of an "L".

3. The bracket of claim 1, wherein the side wall portion is protruded from an end portion of the sideface of the base plate to be parallel therewith and in the shape of an "I".

4. The bracket of claim 1, wherein the displacement portion is inwardly bent to be in contact with the disk drive in the shape of an "S".

5. The bracket of claim 1, wherein each of the displacement portions comprises:
an extension portion extended from the side wall portion in the direction of the side surface of the hard disk;
a bent portion inwardly bent from the extension portion; and
a contact portion extended from the bent portion to be in surface contact with the sideface of the disk drive.

6. A bracket for a disk drive, comprising:
a base plate containing the disk drive;
a side wall portion vertically protruded from an end portion of the base plate;
a displacement portion extended from the side wall portion and bending due to a vibration transmitted by making contact with the disk drive; and
a combination protrusion protruded from the base plate to be inserted into a hole formed on the disk drive,
wherein the combination protrusion comprises:
a projection portion formed on a position of the base plate corresponding to a position of the hole; and
a contact portion formed at the end of the projection portion and inserted into the hole, the contact portion being larger than the projection portion.

7. A bracket for a disk drive, comprising:
a base plate containing the disk drive;
a side wall portion vertically protruded from an end portion of the base plate;
a displacement portion extended from the side wall portion and bending due to a vibration transmitted by making contact with the disk drive;
a combination protrusion protruded from the base plate to be inserted into a hole formed on the disk drive; and
a buffer member having elasticity and interposed between the bracket and the disk drive.

8. A bracket for a disk drive, comprising:
a base plate containing the disk drive;
a side wall portion vertically protruded from an end portion of the base plate; and
a displacement portion extended from the side wall portion and bending due to a vibration transmitted by making contact with the disk drive,
wherein the base plate has partition walls protruded from the surface opposite to the surface where the disk drive is mounted and the partition walls isolate circuits provided below the bracket and prevent mutual interference caused by electromagnetic waves.

9. The bracket of claim 8, wherein a metal coating is formed on the same side as where the partition walls are formed.

10. A bracket for a disk drive, wherein the bracket contains the disk drive on its one surface, and comprises:
side wall portions vertically protruded from the one surface;
a displacement portion extended from the side wall portion in the direction of the one surface, spaced apart from the one surface and bending due to a vibration transmitted by making contact with the disk drive; and
a partition wall protruded from the surface opposite to the one surface, isolating circuits provided below the opposite surface and preventing mutual interference caused by electromagnetic waves.

11. The bracket of claim 10, wherein the side wall portion is protruded from the sideface of the bracket in the vertical direction of the one surface and in the shape of an "I", and the displacement portions are extended from both sides of the side wall portion and inwardly bent to be in surface contact with the sideface of the disk drive.

12. The bracket of claim 10, wherein the side wall portion is protruded from the corner of the one surface and in the shape of an "L", and the displacement portions are extended from both sides of the side wall portion and inwardly bent to be in contact with the sideface of the disk drive.

13. The bracket of claim 10, wherein a metal coating is formed on the surface where the partition walls are formed.

14. The bracket of claim 10, further comprising a combination protrusion protruded from the one surface to be inserted into a hole provided on the disk drive.

15. The bracket of claim 10, wherein the combination protrusion comprises:
a projection portion formed on a position of the one surface corresponding to a position of a hole; and
a contact portion formed at the end of the projection portion and inserted into the hole, the contact portion being larger than the projection portion.

16. The bracket of claim 15, further comprising a buffer member having elasticity and interposed between the bracket and the disk drive.

17. A bracket for a disk drive, wherein the bracket contains the disk drive and comprises partition walls protruded from a surface opposite to a surface where the disk drive is mounted, and the partition walls isolate circuits provided below the bracket and prevent mutual interference caused by electromagnetic waves.

18. The bracket of claim 17, comprising a side wall portion vertically protruded from the surface where the disk drive is mounted,
wherein the side wall portion is protruded from an end portion from the sideface of the surface in the vertical direction of the surface where the disk drive is mounted and in the shape of an "I", and a part of the side wall portion spaced apart from the surface where the disk drive is mounted and inwardly bent to be in contact with the disk drive.

19. The bracket of claim 17, comprising a side wall portion vertically protruded from the surface where the disk drive is mounted,
wherein the side wall portion is protruded from the corner of the surface where the disk drive is mounted and in the shape of an "L", and a part of the side wall portions extended from its both sides while spaced apart from the surface where the disk drive is mounted and inwardly bent to be in contact with the disk drive.

20. A bracket for a disk drive, comprising:
a base plate containing a disk drive having holes; and
combination protrusions protruded from the base plate and inserted into the holes with the disk drive spaced apart from the base plate, wherein each of the combination protrusions comprises:

a projection portion formed on a position of the base plate corresponding to a position of one of the holes; and a contact portion formed at the end of the projection portion and inserted into one of the holes, the contact portion being larger than the projection portion.

21. The bracket of claim 20, wherein each of the holes is in the shape of a cone or a truncated cone and each of the combination protrusions are forcibly inserted into one of the holes.

22. The bracket of claim 20, wherein each of the holes has a projection in its inside for the contact portion to be forcibly inserted into.

23. The bracket of claim 20, further comprising a buffer member having elasticity and interposed between the bracket and the disk drive.

24. A bracket for a disk drive, wherein the bracket contains a disk drive having holes and comprises:

combination protrusions vertically protruded from a surface where the disk drive is mounted and inserted into the holes with the disk drive spaced apart from the surface; and partition walls protruded from a surface opposite to the surface where the disk drive is mounted, and the partition walls isolate circuits provided below the bracket and prevent mutual interference caused by electromagnetic waves.

25. The bracket of claim 24, wherein the combination protrusion comprises:

a projection portion formed on a position corresponding to the position of the hole; and a contact portion formed at the end of the projection portion and inserted into the hole, the contact portion being larger than the projection portion.

26. The bracket of claim 24, wherein a metal coating is formed on the surface opposite to the surface where the disk drive is mounted.

27. The bracket of claim 24, further comprising a buffer member having elasticity and interposed between the bracket and the disk drive.

28. A bracket containing a disk drive, wherein combination protrusions are formed to combine the disk drive and the bracket while spacing apart the disk drive from the bracket and a side wall portion which is protruded from the surface where the disk drive is mounted, and a part of the side wall portion is protruded from the side wall portion of the bracket to be in contact with the sideface of the disk drive movably, partition walls are protruded from the surface opposite to the surface where the disk drive is mounted, and the partition walls isolate circuits provided below the bracket and prevent mutual interference caused by electromagnetic waves.

29. The bracket of claim 28, wherein the side wall portion is protruded from the end portion of the sideface of the surface in the vertical direction of the surface where the disk drive is mounted in the shape of an "I", and a part of the side wall portion is extended from both ends of the side wall portion and inwardly bent to be in contact with the disk drive.

30. The bracket of claim 28, wherein the side wall portion is protruded from the corner of the surface where the disk drive is mounted and in the shape of an "L", and a part of the side wall portion is extended from both ends of the side wall portion and inwardly bent to be in contact with the disk drive.

* * * * *

UNITED STATES PATENT AND TRADEMARK OFFICE
CERTIFICATE OF CORRECTION

| | | |
|---|---|---|
| PATENT NO. | : 7,486,509 B2 | Page 1 of 1 |
| APPLICATION NO. | : 11/320971 | |
| DATED | : February 3, 2009 | |
| INVENTOR(S) | : Ki-Bum Kim et al. | |

It is certified that error appears in the above-identified patent and that said Letters Patent is hereby corrected as shown below:

On the Title Page Item -56- (U.S. Patent Documents), Line 3, change
"5,768,009 A *   6/1998  Little ............................. 361/685" to
--5,768,099        6/1998  Radloff et al. .................. 361/685--.

Signed and Sealed this

Twelfth Day of May, 2009

JOHN DOLL
*Acting Director of the United States Patent and Trademark Office*